UNITED STATES PATENT OFFICE.

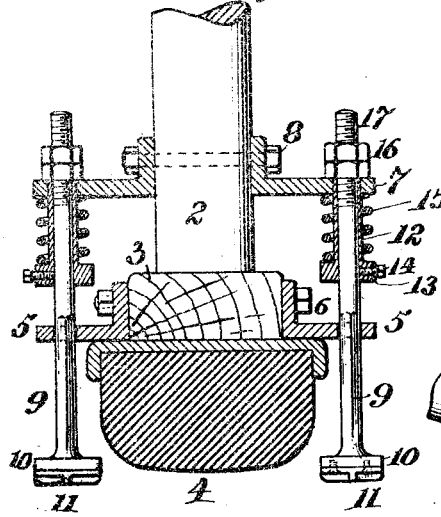

JOHN ROSS, OF PHILADELPHIA, PENNSYLVANIA.

TRACTION AND ANTISKIDDING DEVICE FOR AUTOMOBILES.

1,138,014.  Specification of Letters Patent.  Patented May 4, 1915.

Application filed March 6, 1912. Serial No. 681,885.

*To all whom it may concern:*

Be it known that I, JOHN ROSS, a citizen of the United States, and resident of Philadelphia, county of Philadelphia, and State of Pennsylvania, have invented an Improvement in Traction and Antiskidding Devices for Automobiles, of which the following is a specification.

My invention has reference to traction and anti-skidding devices for automobiles and consists of certain improvements which are fully set forth in the following specification and shown in the accompanying drawings which form a part thereof.

The object of my invention is to provide a means for use with automobile wheels which will increase the traction and prevent skidding and is adapted for attachment to wheels and tires now in use.

While my invention is more especially intended for use when the streets and roads are covered with snow and ice, it is also useful where the roads are sloppy or of such a smooth and hard condition that proper traction cannot be had with ordinary tires.

My invention consists of certain improvements more fully set out hereinafter taken in connection with the drawings and are more specifically defined in the claims.

Referring to the drawings: Figure 1 is a side elevation of a portion of a wheel and tire with my invention applied thereto: Fig. 2 is a cross section of the same; and Fig. 3 is a perspective view of one of the traction shoes removed.

Referring to Figs. 1, 2 and 3, the wheel spokes 2 are provided with the usual felly 3 and a rubber tire 4 of any suitable type. It is shown as having solid tire of rubber but a pneumatic or other tire may be substituted therefor.

Detachably clamped to the sides of the spokes 2 and concentric with the felly are the flanged ring pieces 7, the clamping means being the bolts 8 which are shown on each side of the spokes. Also secured to the sides of the felly and concentric with the flanged ring pieces 7 are the corresponding flanged ring pieces 5, the same being detachably clamped in position upon the felly by bolts 6. The ring pieces 5 and 7 are provided with apertures in radial alinement in which are arranged the radial rods 9, the outer ends of which are flanged into heads 10 to which are detachably secured the traction and anti-skidding shoes 11, shown more fully in Fig. 3. The inner ends of the rods 9 are provided with sleeves 12 guided in the flanged ring pieces 7, said sleeves each having a flange or head 13 through which a set screw 14 extends to clamp the sleeve upon the rod. Coil springs 15 surround the sleeves and press at one end upon the heads 13, and at the other end against the flanged ring pieces 7. Nuts 16 are screwed upon the screw threaded end 17 of the rods 9 to limit the outward movement of the said rods and shoes 11 carried thereby, and yet at all times to permit the inward movement thereof against the action of the springs 15. Normally, the rods 9 are so adjusted as to cause the shoes 11 to be located slightly below the bottom of the tire 4 so as to positively be brought into firm contact with the ground in running over the same. The springs 15 are compressed under the weight of the load on the wheels so that the main load is carried by the tire 4 but assisted by the pressure of the shoes 11 if upon the ground.

In practice, there may be as many of the radial rods 9 and shoes as the duty imposed upon the automobile may require, and this would vary also with the diameters of the wheels. I have shown and prefer to arrange the rods and their shoes upon each side of the felly and tire, as shown in Fig. 2, but I do not restrict myself in this respect. I also prefer to have the flanged ring pieces 5 and 7 removable so that they may be taken off in the summer time, but this is not essential, as the increased traction may be needed under special conditions, as where, for instance, steep grades must be climbed by the automobile with heavy loads.

I have shown my invention in various forms of adaptation for use, but for heavy duty I prefer the construction shown in Figs. 1, 2 and 3, but in all of the constructions, the traction and anti-skidding shoes having the ribs 18 at right angles are employed, and in all cases these shoes are applied in such a way as to normally extend beyond the plane of tire surface and to be combined with means to limit their outward movement while permitting inward movement to compensate for the compression of the tire. I do not restrict myself to the details as these may be modified within the scope of the claims without departing from the spirit of the invention.

Having now described my invention, what I claim as new and desire to secure by Letters Patent, is:—

In a traction and anti-skidding attachment for wheels, the combination of a wheel having a tread portion, with two laterally projecting continuous annular guides respectively secured to the felly and spokes to provide flanges, the guide secured to the spokes having the wider flange, a plurality of rods guided in said flanges and relatively held in position and against rotation therein said rods provided on their outer ends with means for increasing traction and preventing skidding and at their inner ends with screw threaded portions, sleeves having collars secured to the rods and guided in the flanges attached to the spokes and surrounding the screw-threaded ends, springs pressing upon the collars of the sleeves for pressing the rods outwardly and arranged between the guides, and nuts screwed upon the threaded ends of the rods coacting with the sleeves and guides for limiting the outward movement of the rods while permitting the inward movement thereof together with the sleeves.

In testimony of which invention I hereunto set my hand.

JOHN ROSS.

Witnesses:
R. M. KELLY,
E. W. SMITH.